United States Patent
Mody et al.

(10) Patent No.: US 9,473,784 B2
(45) Date of Patent: Oct. 18, 2016

(54) SAMPLE ADAPTIVE OFFSET (SAO) FILTERING IN VIDEO CODING

(71) Applicant: Texas Instruments Incorporated, Dallas, TX (US)

(72) Inventors: Mihir Narendra Mody, Bangalore (IN); Niraj Nandan, Bangalore (IN); Hideo Tamama, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 172 days.

(21) Appl. No.: 14/279,318

(22) Filed: May 16, 2014

(65) Prior Publication Data

US 2014/0341287 A1    Nov. 20, 2014

Related U.S. Application Data

(60) Provisional application No. 61/825,286, filed on May 20, 2013.

(51) Int. Cl.

| | |
|---|---|
| *H04N 19/89* | (2014.01) |
| *H04N 19/14* | (2014.01) |
| *H04N 19/82* | (2014.01) |
| *H04N 19/436* | (2014.01) |
| *H04N 19/176* | (2014.01) |
| *H04N 19/117* | (2014.01) |
| *H04N 19/186* | (2014.01) |
| *H04N 19/182* | (2014.01) |

(Continued)

(52) U.S. Cl.
CPC .......... *H04N 19/436* (2014.11); *H04N 19/117* (2014.11); *H04N 19/14* (2014.11); *H04N 19/176* (2014.11); *H04N 19/182* (2014.11); *H04N 19/186* (2014.11); *H04N 19/423* (2014.11); *H04N 19/82* (2014.11)

(58) Field of Classification Search
CPC .. H04N 19/117; H04N 19/182; H04N 19/89; H04N 19/793
See application file for complete search history.

(56) References Cited

U.S. PATENT DOCUMENTS

| | | | |
|---|---|---|---|
| 2013/0101031 A1* | 4/2013 | Van der Auwera | H04N 19/14 375/240.12 |
| 2013/0329784 A1* | 12/2013 | Chuang | H04N 19/00012 375/240.02 |
| 2014/0036991 A1* | 2/2014 | Chao | H04N 19/82 375/240.02 |

OTHER PUBLICATIONS

Hetul Sanghvi, "Low Power Architecture for Motion Compensation in a 4K Ultra-HD AVC and HEVC Video Codec System", Proceedings of the 2013 IEEE Second International Conference on Image Information Processing, pp. 400-404, Dec. 9-11, 2013, Shimla, India.

(Continued)

*Primary Examiner* — Mehrdad Dastouri
*Assistant Examiner* — Obafemi Sosanya
(74) *Attorney, Agent, or Firm* — Ronald O. Neerings; Frank D. Cimino

(57) ABSTRACT

A method for sample adaptive offset (SAO) filtering of largest coding units (LCUs) of a video frame in an SAO component is provided that includes receiving, by the SAO component, an indication that deblocked pixel blocks of an LCU are available, and applying SAO filtering, by the SAO component, to each pixel block of pixel blocks of an SAO processing area corresponding to the LCU responsive to the indication, wherein pixels of each pixel block of the SAO processing area are filtered in parallel.

16 Claims, 11 Drawing Sheets

(51) Int. Cl.
H04N 19/423 (2014.01)
H04N 19/102 (2014.01)

(56) References Cited

OTHER PUBLICATIONS

"High Efficiency Video Coding", Series H: Audiovisual and Multimedia Systems, Infrastructure of Audiovisual Services—Coding of Moving Video, ITU-T Recommendation H.265, Telecommunication Standardization Sector of International Telecommunication Union, pp. 1-317, Apr. 2013.

Seungyong Park and Kwangki Ryoo, "The Hardware Design of Effective SAO for HEVC Decoder", 2013 IEEE 2nd Global Conference on Consumer Electronics, pp. 303-304, Oct. 1-4, 2013, Tokyo, Japan.

Hetul Sanghvi, "2D Cache Architecture for Motion Compensation in a 4K Ultra-HD AVC and HEVC Video Codec System", 2014 IEEE International Conference on Consumer Electronics, pp. 189-190, Jan. 10-13, 2014.

Sha Shen et al, "A Pipelined VLSI Architecture for Sample Adaptive Offset (SAO) Filter and Deblocking Filter of HEVC", IEICE Electronics Express, vol. 10, No. 11, 1-11, Jun. 10, 2013.

Mahesh Mehendale et al, "A True Multistandard, Programmable, Low-Power, Full HD Video-Codec Engine for Smartphone SoC", 2012 IEEE International Solid-State Circuits Conference, Session 12, pp. 226-228, Feb. 19-23, 2012, San Francisco, CA.

Gary J. Sullivan et al, "Overview of the High Efficiency Video Coding (HEVC) Standard", IEEE Transactions on Circuits and Systems for Video Technology, vol. 22, No. 12, pp. 1649-1668, Dec. 2012.

Mihir Mody et al, "High Throughput VLSI Architecture Supporting HEVC Loop Filter for ULtra HDTV", 2013 IEEE Third International Conference on Consumer Electronics, pp. 54-57, Sep. 9-11, 2013, Berlin, Germany.

Chih-Ming Fu et al, "Sample Adaptive Offset in the HEVC Standard", IEEE Transactions on Circuits and Systems for Video Technology, vol. 22, No. 12, pp. 1755-1764, Dec. 2012.

Chi Ching Chi et al, "Parallel Scalability and Efficiency of HEVC Parallelization Approaches", IEEE Transactions on Circuits and Systems for Video Technology, vol. 22, No. 12, pp. 1827-1838, Dec. 2012.

Jiaya Zhu et al, "A Combined SAO and De-Blocking Filter Architecture for HEVC Video Decoder", 20th IEEE International Conference on Image Processing, pp. 1967-1971, Sep. 15-18, 2013, Melbourne, VIC.

\* cited by examiner

| 0 | 1 | 2 | 3 | ∘∘∘ | 28 | 29 | 30 | 31 |
FIG. 1
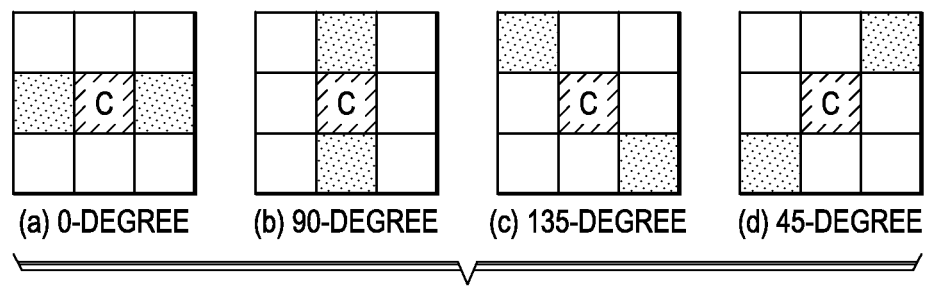
(a) 0-DEGREE  (b) 90-DEGREE  (c) 135-DEGREE  (d) 45-DEGREE
FIG. 2
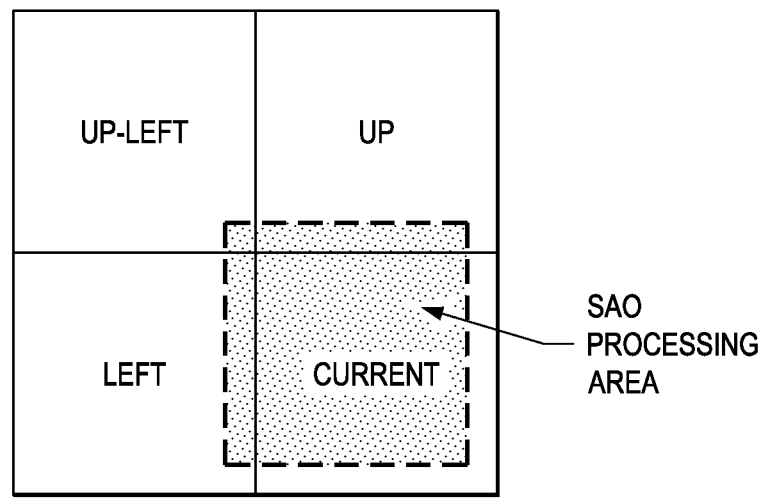
FIG. 5

SAMPLE ADAPTIVE OFFSET (SAO) FILTERING IN VIDEO CODING

CROSS-REFERENCE TO RELATED APPLICATIONS

This application claims benefit of U.S. Provisional Patent Application Ser. No. 61/825,286, filed May 20, 2013, which is incorporated herein by reference in its entirety.

BACKGROUND OF THE INVENTION

1. Field of the Invention

Embodiments of the present invention generally relate to sample adaptive offset (SAO) filtering in video coding.

2. Description of the Related Art

The Joint Collaborative Team on Video Coding (JCT-VC) of ITU-T WP3/16 and ISO/IEC JTC 1/SC 29/WG 11 has developed the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the HEVC standard defines two in-loop filters: a deblocking filter to reduce blocking artifacts and a sample adaptive offset filter (SAO) to reduce distortion caused by intensity shift. These filters may be applied sequentially, and, depending on the configuration, the SAO filter may be applied to the output of the deblocking filter. This in-loop filtering is one of most computationally intensive parts of the decoding process and may be approximately 15-20% of the overall decoding complexity.

SUMMARY

Embodiments of the present invention relate to methods and apparatus for sample adaptive offset (SAO) filtering in video decoding. In one aspect, a method for sample adaptive offset (SAO) filtering of largest coding units (LCUs) of a video frame in an SAO component is provided that includes receiving, by the SAO component, an indication that deblocked pixel blocks of an LCU are available, and applying SAO filtering, by the SAO component, to each pixel block of pixel blocks of an SAO processing area corresponding to the LCU responsive to the indication, wherein pixels of each pixel block of the SAO processing area are filtered in parallel.

In one aspect, an apparatus for sample adaptive offset (SAO) filtering is provided that includes a memory, a controller coupled to the memory and configured to sequence loading of pixel blocks of an SAO processing area into the memory, filtering of the pixel blocks by a filter engine, and storing of the filtered pixel blocks, wherein the SAO processing area corresponds to a largest coding unit (LCU) of a video frame, and wherein the loading, filtering, and storing is performed responsive to an indication that deblocked pixel blocks of the LCU are available, and the filter engine coupled to the controller and the memory, wherein the filter engine is configured to apply SAO filtering to a pixel block of the SAO processing area stored in the memory, wherein all pixels in the pixel block are filtered in parallel.

BRIEF DESCRIPTION OF THE DRAWINGS

Particular embodiments will now be described, by way of example only, and with reference to the accompanying drawings:

FIG. 1 is an example illustrating band offset (BO) classification in sample adaptive offset (SAO) filtering;

FIG. 2 is an example illustrating edge offset (EO) classification patterns in SAO filtering;

FIG. 5 is an example illustrating the SAO processing area of a largest coding unit (LCU);

FIGS. 8-13 are examples; and

DETAILED DESCRIPTION OF EMBODIMENTS OF THE INVENTION

Figure 3:
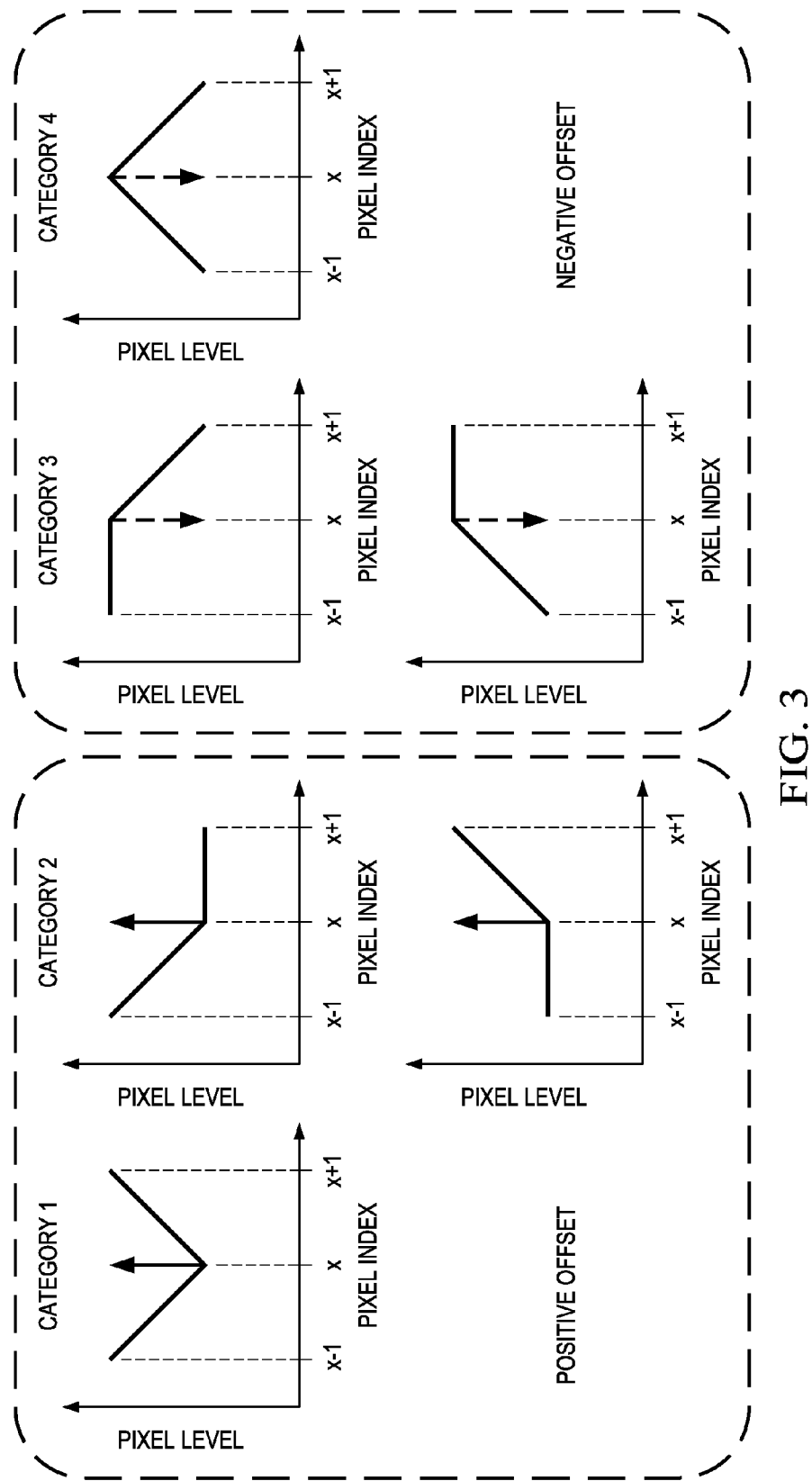
FIG. 3 is an example illustrating edge types by EO category.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. Note that an LCU may also be called a coding tree unit (CTU) in some documents. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

The current released version of HEVC is described in the following document, which is incorporated by reference herein: "ITU-T recommendation H.265: High Efficiency Video Coding", Telecommunication Standardization Sector of International Telecommunication Union (ITU-T), April, 2013 ("HEVC Standard").

As previously mentioned, a sample adaptive offset (SAO) in-loop filter is one of the in-loop filters included in the HEVC standard. These in-loop filters are applied in the encoder and the decoder. A high level description of SAO is provided herein. A more detailed description may be found, for example, in the HEVC Standard and C. Fu, et al., "Sample Adaptive Offset in the HEVC Standard," IEEE Transactions on Circuits and Systems for Video Technology, Vol. 22, No. 12, pp. 1755-1764, December 2012. SAO may be applied to reconstructed pixels after application of a deblocking filter. In general, SAO involves adding an offset to compensate for intensity shift directly to a reconstructed pixel. The value of the offset depends on the local characteristics surrounding the pixel, i.e., edge direction/shape and/or pixel intensity level. There are two kinds of offsets that may be applied: band offsets (BO) and edge offsets (EO). The band offset classifies pixels by intensity interval of the reconstructed pixel, while edge offset classifies pixels based on edge direction and structure.

To determine band offsets, pixels are classified by intensity level of the corresponding reconstructed pixels. As illustrated in FIG. 1, to determine band offsets, reconstructed pixels are classified into multiple bands where each band contains pixels in the same intensity interval. That is, the intensity range is equally divided into 32 bands from zero to the maximum intensity value. For example, for 8-bit pixels with values ranging from 0 to 255, the width of each band is 8, and pixel values from 8 k to 8 k+7 are in a band k, where $0 \le k \le 31$. The offset for a band may be computed as an average of the differences between the original pixel values and the reconstructed pixel values of the pixels classified into the band.

To determined edge offsets, reconstructed pixels are classified based on a one dimensional (1-D) delta calculation. That is, the pixels can be filtered in one of four edge directions (0, 90, 135, and 45) as shown in FIG. 2. For each edge direction, a pixel is classified into one of five categories based on the intensity of the pixel relative to neighboring pixels in the edge direction. Categories 1-4 each represent specific edge shapes as shown in FIG. 3 while category 0 is indicative that none of these edge shapes applies. Offsets for each of categories 1-4 are also computed after the pixels are classified.

More specifically, for each edge direction, a category number c for a pixel is computed as c=sign (p0−p1)+sign (p0−p2) where p0 is the pixel and p1 and p2 are neighboring pixels, i.e., the "shaded" pixels of FIG. 2. The edge conditions that result in classifying a pixel into a category are shown in Table 1 and are also illustrated in FIG. 3. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
|---|---|
| 1 | p0 < p1 and p0 < p2 |
| 2 | (p0 < p1 and p0 = p2) or (p0 < p2 and p0 = p1) |
| 3 | (p0 > p1 and p0 = p2) or (p0 > p2 and p0 = p1) |
| 4 | p0 > p1 and p0 > p2 |
| 0 | none of above |

In HEVC, the determination of the SAO filter type and offsets for color components is performed at the LCU level. The encoder decides which of the SAO filter types is to be used for each color component, i.e., Y, Cb, and Cr, of an LCU. The encoder may use any suitable criteria for selecting the SAO filter types for the color components. For example, the encoder may decide the best SAO filter type and associated offsets for each color component based on a rate distortion technique that estimates the coding cost resulting from the use of each SAO filter type. More specifically, for each color component, the encoder may estimate the coding costs of SAO parameters, e.g., the SAO filter type and SAO offsets, resulting from using each of the predefined SAO filter types for the color component. The encoder may then select the option with the best coding cost for the color component. LCUs may also be "merged" for purposes of signaling SAO parameters in the compressed bit stream. In addition to directly determining the best SAO filter type and offsets for the color components of an LCU, the encoder may also consider the coding costs resulting from using the SAO parameters of corresponding color components in left and upper neighboring LCUs (if these neighboring LCUs are available). If the SAO parameters of one of the neighboring LCUs provide the best coding cost, one or more merge flags (one per color component as appropriate) are signaled in the compressed bit stream rather than directly signaling SAO parameters.

Embodiments of the invention provide for high throughput SAO filtering in video coding. More specifically, some embodiments may support 4K@60 fps (frames per second) for the next generation Ultra HDTV at 100 MHz clock. In some embodiments, 64×64 blocks of pixels (the size of the largest LCU in HEVC) may be filtered in less than 800 cycles with performance directly scaling down based on LCU size. Some embodiments provide LCU level SAO filtering with a three-stage internal pipeline. Some embodiments use a novel filtering order as well as a novel scanning order and 4×4 pixel block based processing to improve filtering performance.

Figure 4:
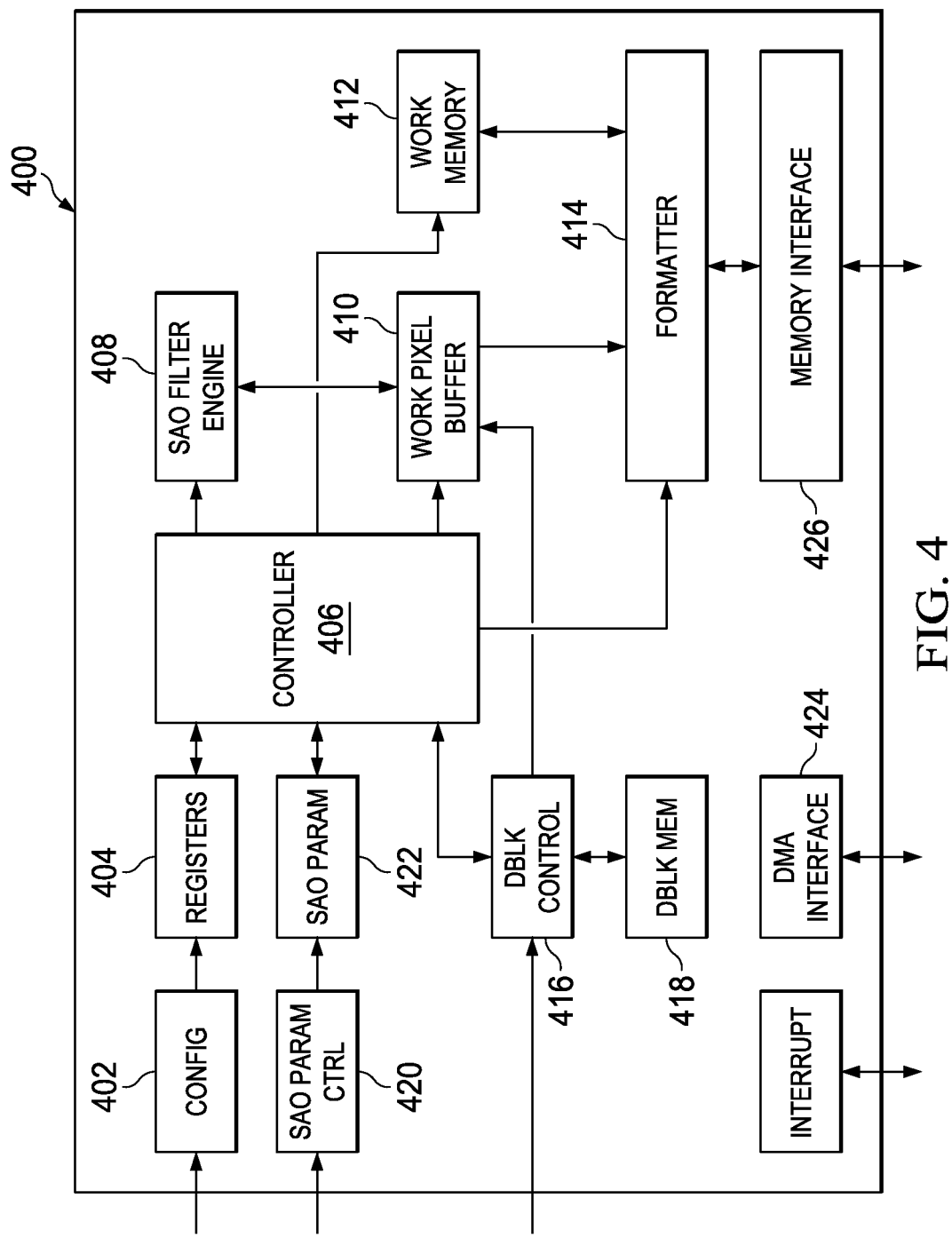
FIG. 4 is a block diagram of an SAO filter architecture.

FIG. 4 is a block diagram of an SAO filter architecture 400 suitable for use in a video encoder or a video decoder. This architecture assumes a multi-ported pool of on-chip memory shared with other components of the video encoder or video decoder that supports concurrent accesses by the various components. The unit or granularity of pixel data which is shared between various components is a block of pixels. A pixel block is a non-overlapping small rectangular region of a frame that may be 4 pixels wide and 4 pixels high (4×4) for luma and 8 pixels wide and 2 pixels high (8×2) for chroma. However, the pixel blocks filtered by the SAO filter architecture are 4×4, regardless of color component. The architecture also assumes a shared direct memory access (DMA) component in the video encoder or decoder which manages data transfers between the shared memory and external memory.

The architecture 400 implements SAO filtering at the LCU level rather than at the frame level as specified in the HEVC standard while maintaining compliance with the expected output of frame level SAO filtering. The architecture 400 also assumes that the video encoder or video decoder performs deblocking at the LCU level. Because deblocking is also performed at the LCU level, deblocked pixel blocks from the neighboring left and bottom LCUs needed for the EO mode in SAO filtering of the right column and bottom row of a typical LCU are not available. Thus, the filtering of the right and bottom pixel blocks of an LCU is delayed until the needed deblocked pixel blocks are available. The architecture 400 is designed to handle the delay in availability of these pixel blocks.

More specifically, the area filtered in each LCU-based SAO cycle is shifted in the frame, i.e., the SAO processing area associated with an LCU is shifted up by one row of pixel blocks and left by one column of pixel blocks. This shifting is illustrated by the "shaded" area in the example of FIG. 5. Note that four sets of SAO parameters may be needed for SAO filtering of a processing area. As is explained in more detail herein, the architecture 400 implements a buffering scheme to handle the delay in filtering of the right and bottom pixel blocks of an LCU.

Referring again to FIG. 4, the various components of the architecture 400 are now briefly described. Operation of the various components during the SAO filtering process is described in more detail in reference to the methods of FIGS. 6 and 7. The controller 406 manages the operation of various components of the SAO filter architecture 400. More specifically, the controller 406 sequences all filtering operations, e.g., loading of deblocked pixels, filtering, and formatting. The SAO parameter buffer 422 stores SAO parameters for the LCUs to be filtered. The SAO parameter buffer 422 operates in a first-in-first-out (FIFO) fashion. In a video decoder, as SAO parameters for LCUs are decoded from an encoded bit stream by the decoder, the decoder stores the parameters in the SAO parameter buffer 422 via the SAO parameter control 420. In a video encoder, the SAO parameters for an LCU are estimated by the encoder and stored in the SAO parameter buffer 422 via the SAO parameter control 420.

The configuration module 402 receives various frame level parameters, e.g., height and width of the current frame, height and width of an LCU in the frame, etc., and stores these parameters in the configuration registers 404. The SAO filter engine 408 performs the actual filtering operation on the pixels of each pixel block. The input to the filter engine is a 3×3 block of pixel blocks formed by the pixel block to be filtered and the eight neighboring pixel blocks needed for EO mode SAO filtering of the pixel block. This 3×3 block of pixel blocks is referred to as a filter block herein. The SAO filter engine 408 filters the 16 pixels of a pixel block in parallel.

The DMA (direct memory access) interface 424 may be used by the controller 406 to trigger the DMA to read and write data between the shared memory pool and the off-chip memory. The memory interface 426 may be used to read and write data between various components of the architecture 400 and the shared memory pool. The formatter 414 converts filtered luma and chroma pixel blocks to the format expected by other parts of the encoder or decoder prior to storing the filtered pixel data in the shared memory pool. For example, the formatter 114 may perform pixel block to raster conversion and interleaving of filtered Cb and Cr blocks. The DBLK control 416 manages the DBLK memory 418 storing the deblocked pixels of the LCU being filtered. The DBLK control 416 receives deblocked pixel blocks and stores the pixel blocks in the DBLK memory 418 and provides deblocked pixel blocks to the work pixel buffer 410 as directed by the controller 406.

The working memory 412 stores two left work buffers of deblocked pixel blocks and a top work buffer of deblocked pixel blocks needed for filtering the SAO processing area being processed as well as any SAO parameters needed for filtering certain pixel blocks in these buffers. The left work buffers are referred to as Left Work Buffer 0 and Left Work Buffer 1 herein. The management and use of the three buffers is described in more detail herein in reference to the method of FIG. 7. The work pixel buffer 410 is used to build the filter blocks for input to the SAO filter engine 408. The work pixel buffer 410 is sized to support the pipelined load/filter/store filtering operation. Thus, the work pixel buffer 410 includes sufficient memory to store the nine pixel blocks of the filter block being processed by the SAO filter engine 408 as well as additional pixel blocks for loading the next filter blocks needed to form the subsequent filter block. The work pixel buffer 410 further includes sufficient memory to store the filtered pixel block output by the filtering engine and the previously filtered pixel block to be transferred from the work pixel buffer 410 to the formatter 414. The work pixel buffer 410 includes sufficient memory to store the SAO parameters for the pixel blocks of the four LCUs included in the SAO processing area being filtered and sufficient memory to store certain pixel blocks for updating the work buffers.

Figure 6:
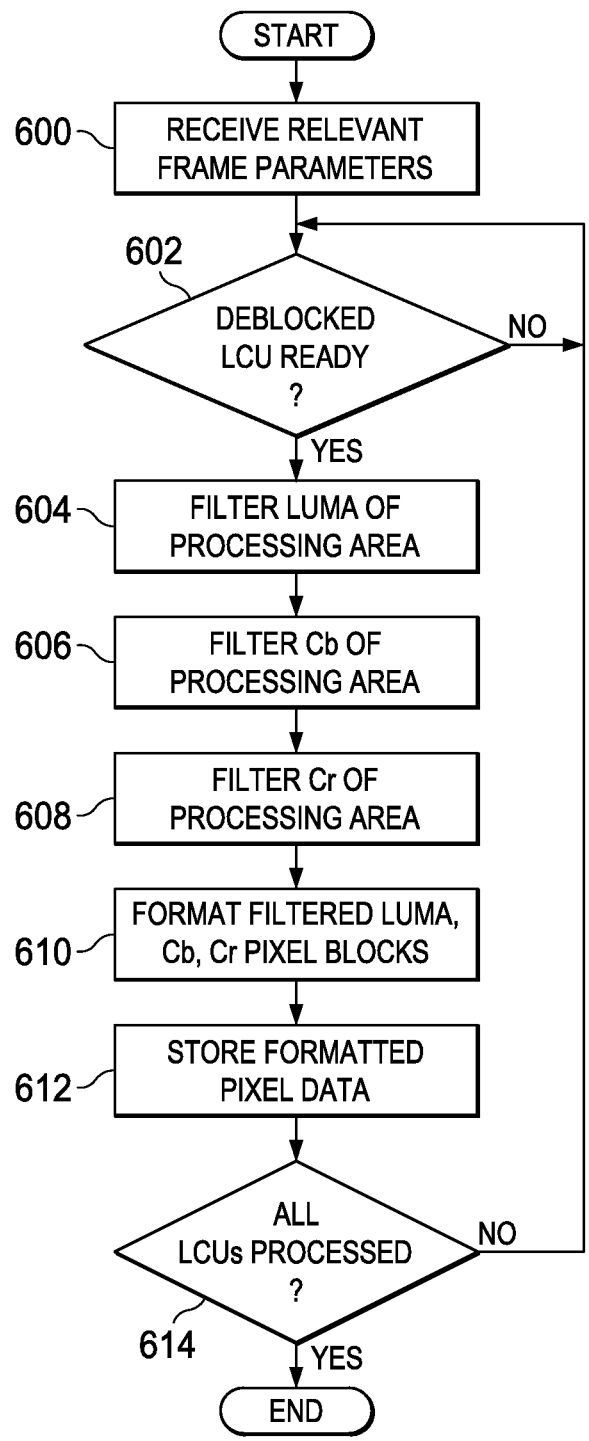
FIGS. 6 and 7 are flow diagrams of methods.
Figure 7:
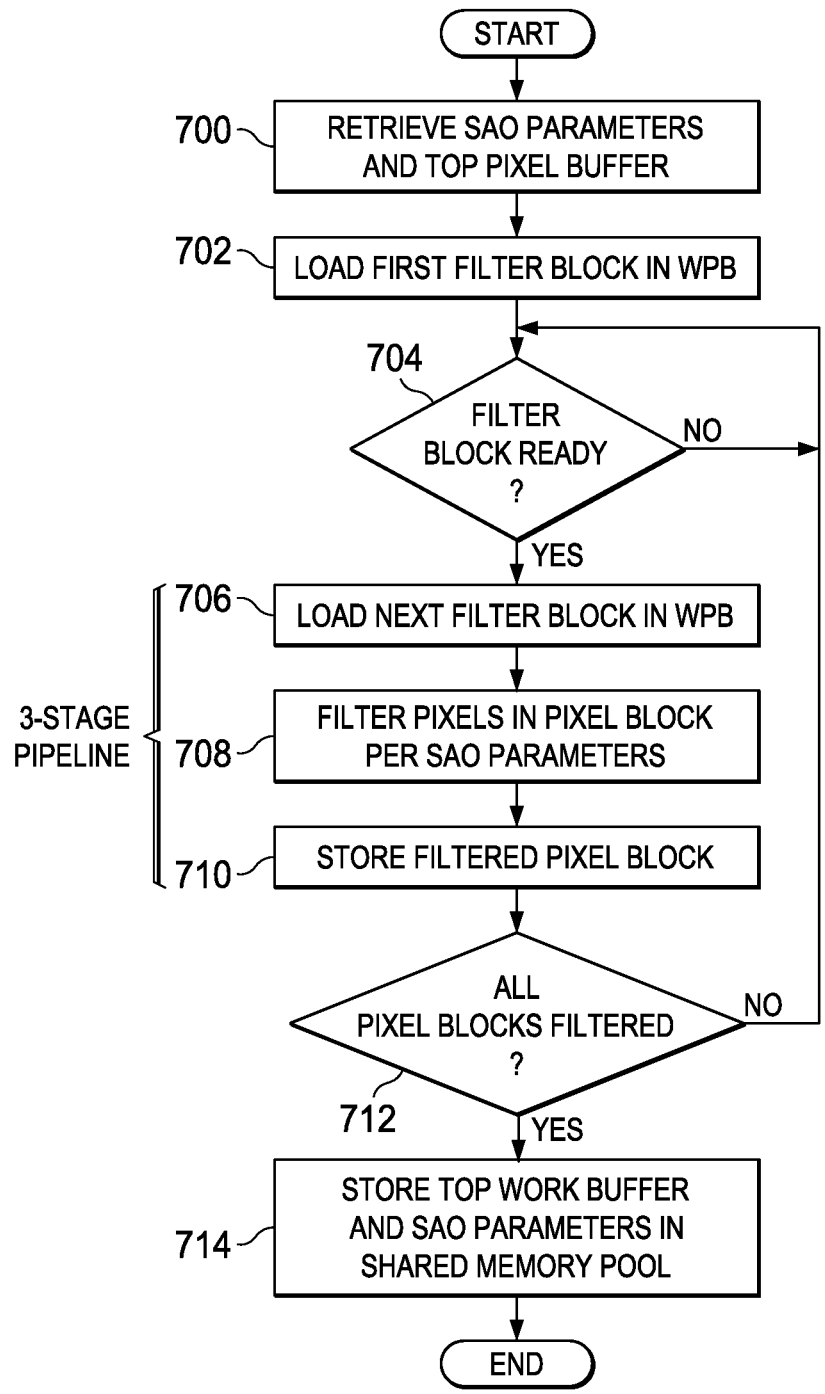

FIGS. 6 and 7 are flow diagrams of methods for SAO filtering that may be performed by the architecture of FIG. 4. FIG. 6 is a method of filtering a frame and FIG. 7 is a method of filtering a pixel color component of an LCU. Although method steps may be presented and described in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

As shown in FIG. 6, when the SAO filtering of a frame of decoded video is initiated, the relevant frame parameters are received 600 in the registers 404 of the architecture 400. These parameters are read from the registers 404 by the controller 406 and used to perform any initialization that may be needed. For example, the controller 406 may use the height and width of the frame and the LCU size to determine the number of LCUs in a frame, the number of LCUs in a row, etc. In another example, a frame parameter may indicate that SAO filtering is disabled at slice and or tile boundaries. The controller 406 may then use this to disable SAO filtering at these boundaries. Disabling of SAO filtering for boundary conditions is described below in reference to FIG. 14. Steps 602-604 illustrate the operation flow for filtering each LCU the frame and are repeated until all LCUs in the frame are processed 614.

When a deblocked LCU is ready 602 (and SAO filtering of the previous SAO processing area is finished), the controller 406 initiates the SAO filtering of an SAO processing area associated with the current deblocked LCU. When a deblocked LCU is available in DBLK memory 418, the controller 406 receives a signal from the DBLK control 416. The controller 406 then causes the DBLK control 416 to begin loading the deblocked pixel blocks of the LCU into the work pixel buffer 410. Loading of deblocked pixel blocks is described in more detail in reference to the method of FIG.

7. A deblocked LCU is ready when all portions of the LCU that can be deblocked have been deblocked. Due to the definition of deblocking in HEVC, the bottom three lines of pixels of an LCU will not be deblocked when made available for SAO filtering.

The color components of the SAO processing are then filtered in turn according to the method of FIG. 7, i.e., the luminance (luma) component is filtered 604, then the Cb component is filtered 606, and finally the Cr component is filtered 608. The filtered color component pixel blocks are formatted 610 in the formatter 414, and the formatted pixel data is stored 612 in the shared memory pool via the memory interface 426. In general, the formatter 414 bypasses the filtered luma pixel blocks, i.e., the filter luma pixel blocks are stored directly into the shared memory pool, and interleaves the filtered Cb and Cr pixel blocks prior to storage in the shared memory pool. Because all Cb pixel blocks are filtered before the Cr pixel blocks, the formatter 414 stores the Cb pixels blocks in an internal work memory and initiates the interleaving process as the Cr pixel blocks are filtered. The pixel blocks are stored in the shared memory pool in block format. In some embodiments, the formatter 414 may also convert the filtered pixel data to raster format for storage in the shared memory pool.

Figures 8, 11A, 11B, 11C, 11D, 11E:
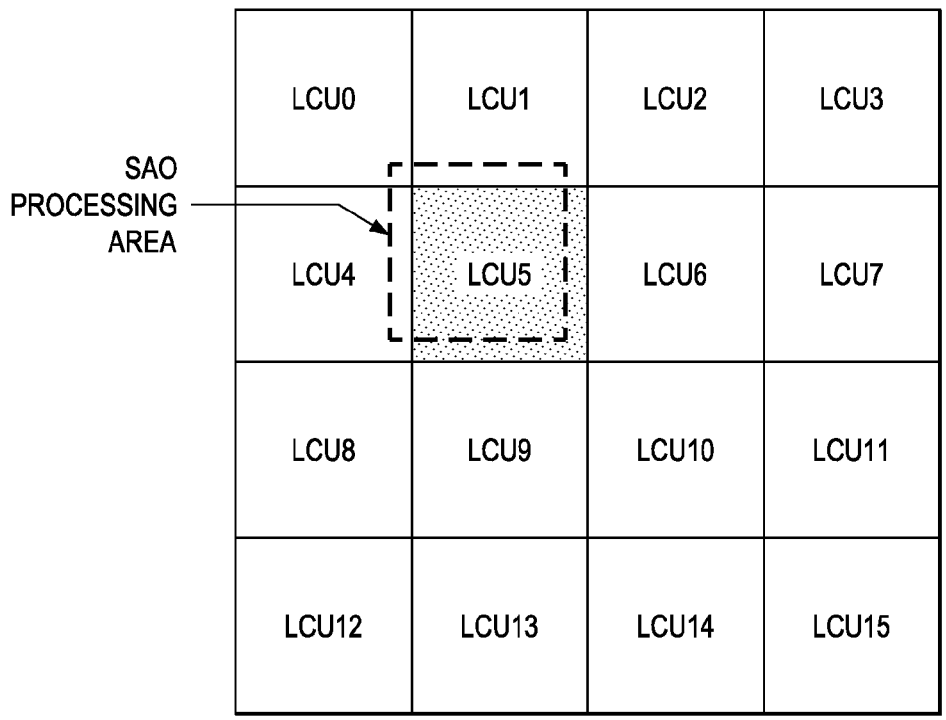

FIG. 7 is a flow diagram of a method of SAO filtering of a color component of an SAO processing area associated with an LCU. As was previously mentioned, the SAO processing area is the actual portion of the frame that will be SAO filtered when deblocked data for an LCU is available. The method is explained ignoring any boundary processing issues and in reference to the example of FIGS. 8-11E. FIG. 8 shows an example frame divided into 32×32 LCUs. For purposes of explaining the method, the assumption is made that the SAO processing area of LCU5 is being filtered. Thus, the SAO processing areas of LCU0-LCU4 have been filtered. Note that the SAO processing area of LCU5 includes the bottom right pixel block of LCU0, all the pixels blocks of the bottom row of LCU1 except the one at the bottom right, and all of the pixel blocks of the rightmost column of LCU4 except the one at the bottom right.

Figure 9:
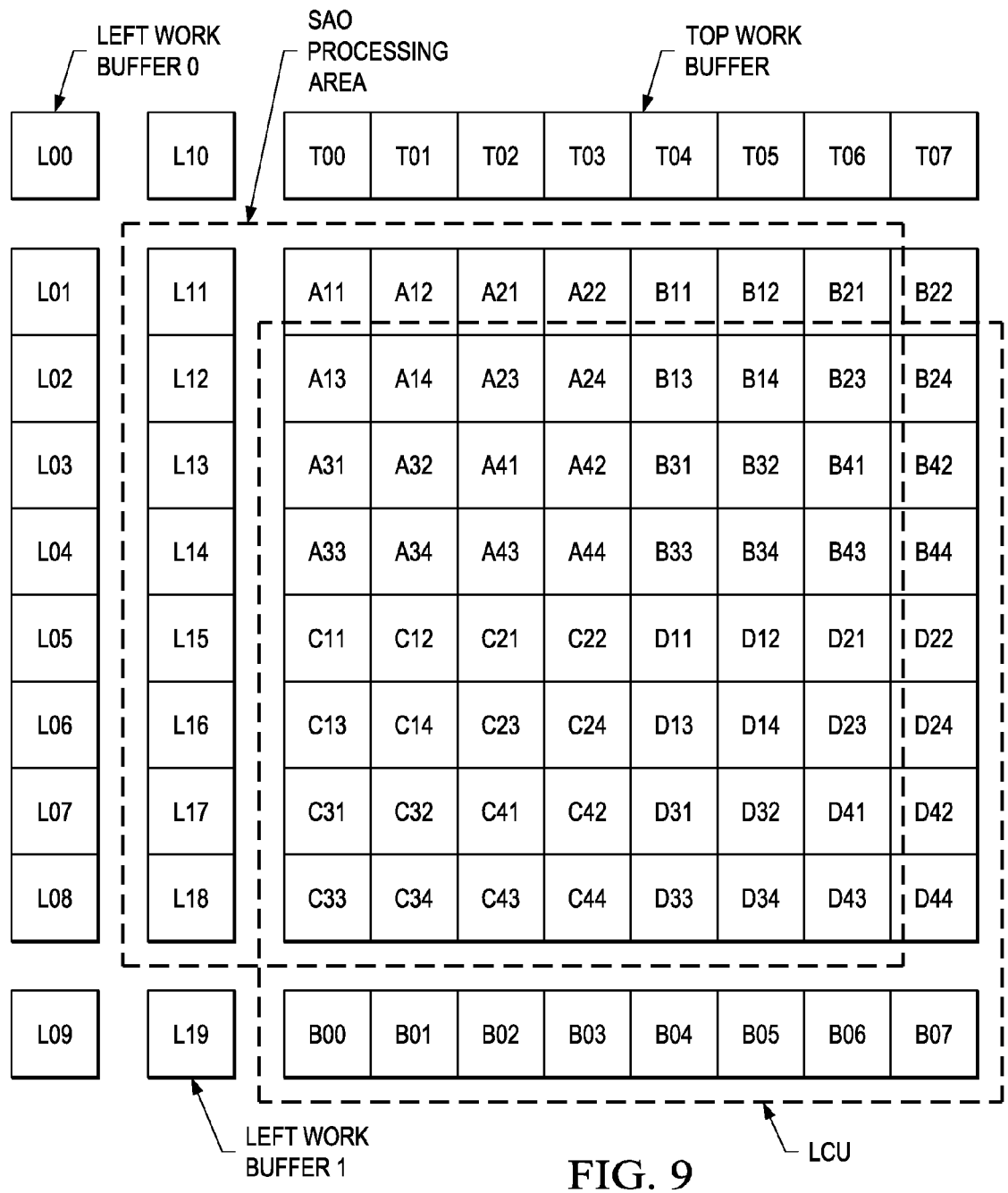

The example of FIG. 9 shows the three work buffers stored in work memory 412, a 32×32 LCU divided into 4×4 pixel blocks, and the SAO processing area associated with the LCU, also divided into 4×4 pixel blocks. For purposes of the initial explanation of the method, this example is assumed to correspond to LCU5 of FIG. 8. Note that the SAO processing area includes deblocked pixel blocks in Left Work Buffer 1. The pixel block L11 is the bottom right pixel block of LCU0 and the pixel blocks L12-L19 are the deblocked pixel blocks of the rightmost column of LCU4. Further, Left Work Buffer 1 includes pixel block L10 which is the pixel block of LCU0 immediately above the bottom right pixel block of LCU0. These pixel blocks were stored in Left Work Buffer 1 when the SAO processing area of the previous LCU, e.g., LCU4, was filtered.

In Left Work Buffer 0, the deblocked pixel block L01 is the pixel block in LCU0 immediately to the left of the bottom right pixel block of LCU0 and the deblocked pixel block L00 is the pixel block in LCU0 immediately to the left and above the bottom right pixel block of LCU0. Further, pixel blocks L02-L09 are the pixel blocks of the column of LCU4 immediately to the left of the rightmost column of LCU4 Pixel blocks L02-L08 are completed deblocked and the top row of pixels of L09 are deblocked. The pixel blocks were stored in Left Work Buffer 0 when the SAO processing area of the previous LCU, e.g., LCU4, was filtered.

The pixel blocks in the Top Work Buffer are the deblocked pixel blocks of the second to last row of LCU1. The pixel blocks in the Top Work Buffer were saved in the shared memory pool when the SAO processing area associated with LCU1 was filtered and are retrieved from the shared memory pool when needed for filtering of the SAO processing area associated with LCU5. Note that the pixel blocks needed to populate the top work buffers for a subsequent row of LCUs are saved in the shared memory pool rather than the work memory 412 as the SAO processing areas of the previous row of LCUs are filtered in order to reduce the size of the work memory 412.

Referring again to FIG. 7, when filtering of an SAO processing area is initiated, the SAO parameters needed to filter the SAO processing area are retrieved 700 by the controller 406 and stored in the work pixel buffer 410. In addition, the pixel blocks needed to filter the top row of pixel blocks in the SAO processing area are retrieved by the controller 406 from the shared memory pool and stored in the top work buffer in the work memory 412. More specifically, the SAO parameters for the LCU, e.g., LCU5, are retrieved 700 from the SAO parameter buffer 422 by the controller 406 and stored in the work pixel buffer 410. Further, the SAO parameters needed to filter the top row of pixel blocks of the SAO processing area, e.g., L11, A11, A12, A21, A22, B11, B12, and B21 of FIG. 9, are retrieved by the controller 406 and stored in the work pixel buffer. The top left pixel block of the SAO processing area, e.g., L11 of FIG. 9, is the bottom right pixel block of the top left neighboring LCU, e.g., LCU0 of FIG. 8, so the SAO parameters of that LCU are needed for filtering this pixel block. The remaining pixel blocks of the top row of the SAO processing area, e.g., A11, A12, A21, A22, B11, B12, and B21 of FIG. 9, are the bottom row of the top neighboring LCU, e.g., LCU1 of FIG. 8, less the rightmost block, so the SAO parameters of that LCU are needed for filtering these pixel blocks.

The SAO parameters for the top row of the SAO processing area are stored in the shares memory pool when the SAO processing areas of the previous row of LCUs are filtered and are retrieved by the controller 406 as needed. Note that the pixels blocks in the left column of the SAO processing area, e.g., L12-L18 of FIG. 9, except for the top pixel block are from the previous LCU, e.g., LCU3, so the SAO parameters for this LCU are needed for filtering these pixel blocks. These SAO parameters are already in the work pixel buffer and need not be retrieved by the controller 406.

Referring again to FIG. 7, the pixel blocks of the first filter block to be processed are loaded 702 into the work pixel buffer 410. The controller 406 causes the needed pixel blocks to be loaded from the left and top work buffers in the work memory 412 and/or DBLK memory 418 as needed. For example, the first pixel block of the SAO processing area associated with LCU5 of FIG. 8 to be filtered will be L11 of the Left Work Buffer 1 as shown in FIG. 9. To form the filter block for the pixel block L11, the controller 406 causes L10, L11, and L12 to be copied from the Left Work Buffer 1 to the work pixel buffer 410, L00, L01, and L02 to be copied from the Left Work Buffer 0 to the work pixel buffer 410, T00 to be copied from the top work buffer to the work pixel buffer 410, and A11 and A13 to be copied from DBLK memory 418 to the work pixel buffer 410. FIG. 11A shows the content of the filter block for L11.

Figure 13:
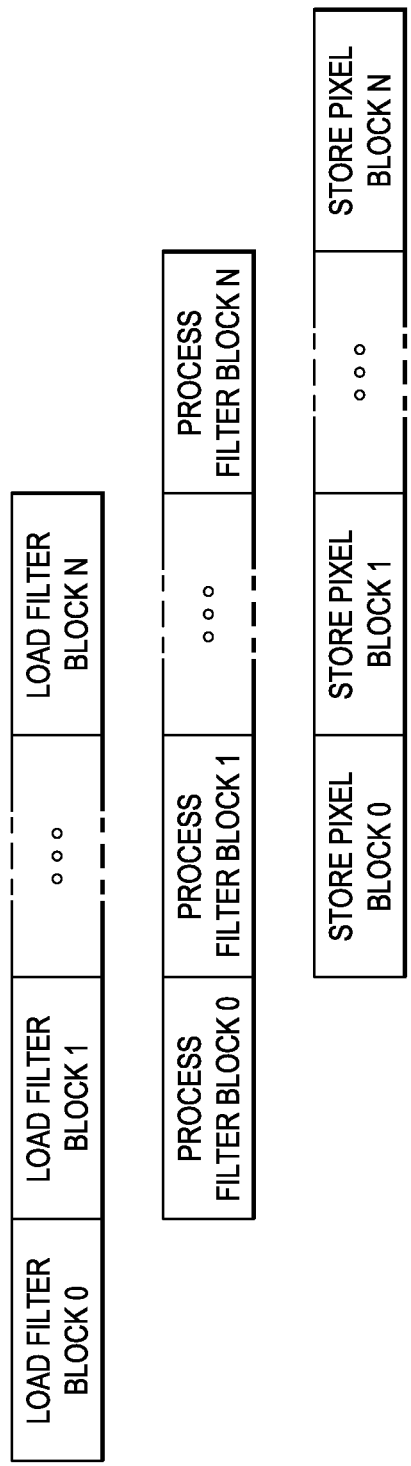

Once the initial filter block is ready 704, the pipelined filtering process begins. In this pipelined process, the following operations are performed in parallel: the next filter block is loaded 706 into the work pixel buffer 410, the current filter block is processed by the filter engine 408 to filter 708 the current pixel block, and the previously filtered pixel block is stored 710. FIG. 13 is a conceptual illustration of this three stage pipelined filtering process. The filtering process continues 712 until all pixel blocks in the SAO processing area have been filtered.

Figure 10:
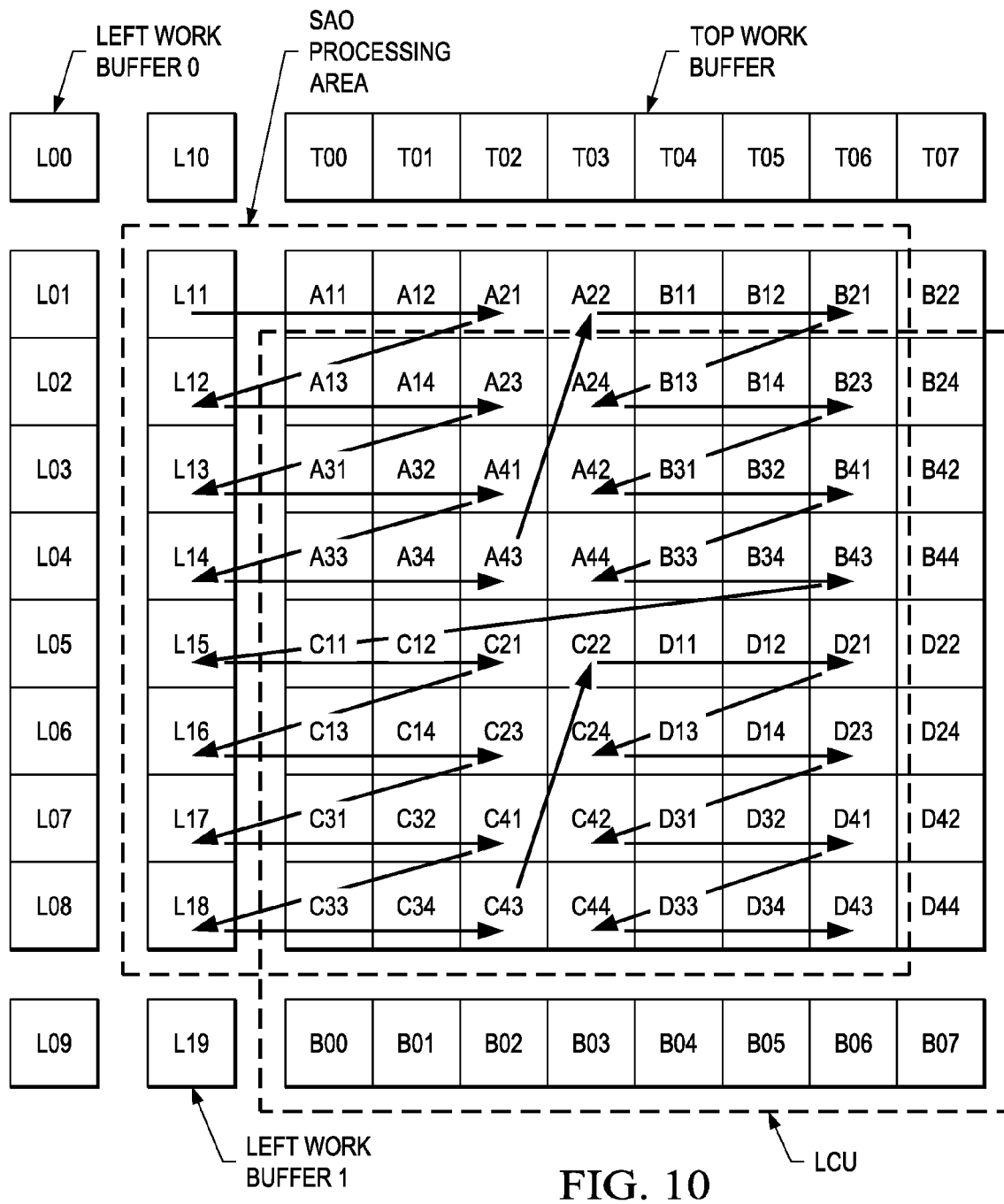
Figure 12:
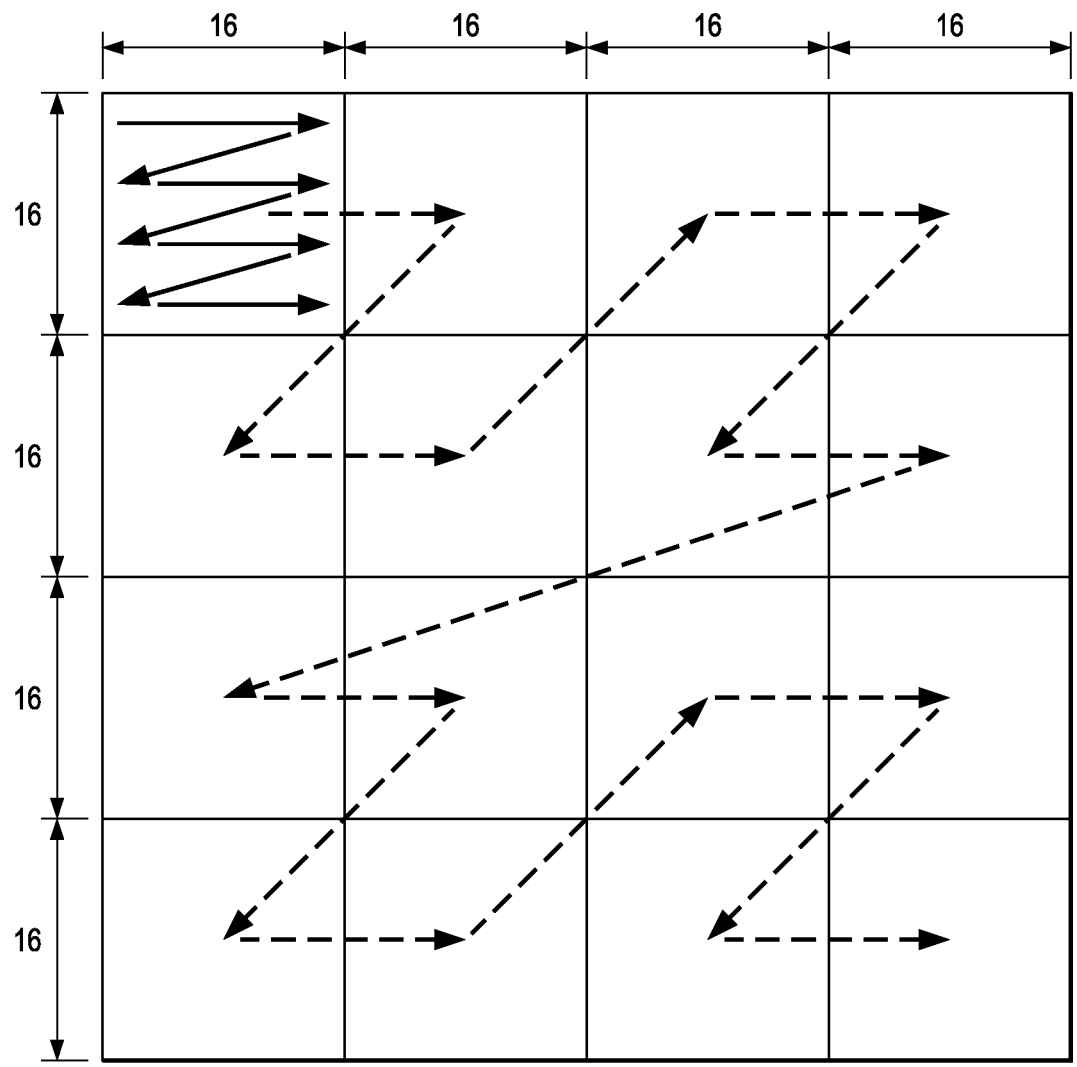

The pixel blocks in the SAO processing area are filtered in a novel scan order. As illustrated in the example of FIG. 12, the SAO processing area is divided into 16×16 sub-processing areas. Within a 16×16 sub-processing area, the pixels blocks are filtered in raster scan order. The 16×16 sub-processing areas are processed in Z-scan order. The example of FIG. 10 illustrates the detailed pixel block filtering order for the example 32×32 SAO processing area of FIG. 9.

Filter blocks for the pixel blocks to be filtered are loaded 706 into the work pixel buffer 410 according to this filtering order. Further, the number of pixel blocks to be loaded for a load stage of the pipelined filtering process depends on the location of the next pixel block to be filtered in the filtering order. For example, referring to FIG. 9 and FIGS. 11A-11E, as previously described, to filter the first pixel block L11 in the SAO processing area, L00, L01, L02 L10, L12, T00, A11, and A12 are loaded into the work pixel buffer 410 along with L11. This filter block is shown in FIG. 11A. The next pixel block to be filtered is A11. The filter block for A11 is shown in FIG. 11B. Note that six of the nine pixel blocks needed to form the filter block for A11, including the pixel block A11, will already be loaded in the work pixel buffer 410. Thus, the load stage of the filter block for A11 will only load three neighboring pixel blocks, T01, A12, and A14.

The next pixel block after A11 to be filtered is A12. The filter block for A12 is shown in FIG. 11C. Note that six of the nine pixel blocks needed to form the filter block for A12, including the pixel block A12, will already be loaded in the work pixel buffer 410. Thus, the load stage of the filter block for A12 will only load three neighboring pixel blocks, T02, A21, and A23. The next pixel block after A12 to be filtered is A21. The filter block for A21 is shown in FIG. 11D. Note that six of the nine pixel blocks needed to form the filter block for A21, including the pixel block A21, will already be loaded in the work pixel buffer 410. Thus, the load stage of the filter block for A21 will only load three neighboring pixel blocks, T03, A22, and A24.

The next pixel block after A21 to be filtered is L12. The filter block for L12 is shown in FIG. 11E. Given that the work pixel buffer 410 is sized to hold the current filter block and three additional pixel blocks, none of the pixel blocks need to form the filter block for L12 will be in the work pixel buffer 410. Thus, the load stage of the filter block for L12 will load all nine pixel blocks of the filter block.

Referring again to FIG. 7, the sixteen pixels of the current pixel block are filtered 708 in parallel by the filter engine 408 and the filtered pixels are stored in the work pixel buffer 410 in the filter stage of the pipeline. The operation of the filter engine to filter a pixel block is described herein in reference to FIG. 14. As previously mentioned, the work pixel buffer 410 is sized to hold the filtered pixel block being generated by the filter engine and the previously filtered pixel block. The previously filtered pixel block is stored 710 in the store stage of the pipeline. Where this previously filtered pixel block is stored depends upon which color component of the SAO processing area is being filtered. If the luma color component is being filtered, the filtered pixel block bypasses the formatter 414 and is stored in the shared memory pool. If the Cb color component is being filtered, the formatter 414 stores the filtered pixel blocks in an internal memory. If the Cr color component is being filtered, the formatter 414 interleaves the filtered Cb pixel blocks and the filtered Cr pixel blocks and stores them in the shared memory pool.

As previously mentioned, the rightmost column of pixel blocks and the bottom row of pixel blocks of the current LCU, e.g., LCU5 of FIG. 8, cannot be filtered due to unavailability of needed deblocked neighbors. The rightmost column of pixel blocks (except the bottom pixel block) will be filtered as part of the SAO filtering area of the subsequent LCU, e.g., LCU6 of FIG. 8. Thus, the pixel blocks of this rightmost column, e.g., B22, B24, B42, B44, D22, D24, D42, D44, and B07 of FIG. 9, need to be stored in the Left Work Buffer 1 prior to filtering the SAO processing area of LCU6 as well as the last pixel block in the Top Work Buffer, e.g., T07 of FIG. 9. The pixel blocks that will form the Left Work Buffer 1 for the next LCU, e.g., LCU6 of FIG. 8, are copied into the appropriate locations in this buffer in the work memory 412 "on-the-fly" when certain pixel blocks of the SAO processing area of the current LCU, e.g., LCU 5 of FIG. 8, are filtered.

The on-to-fly copying to the work buffer happens only when a pixel block in the work buffer is no longer needed for filtering. For example, when T07, B22, B24, and B42 are stored in the work pixel buffer 410 as part of one or more filter blocks, they can be copied to respective locations L10, L11, L12, and L13 in the Left Work Buffer 1 as the contents of these locations in the Left Work Buffer 1 are no longer needed for filtering of the SAO processing area. However, B44 cannot be copied to L14 the first time it is loaded into the work pixel buffer 410 as the current L14 is needed for filtering of subsequent pixel blocks. B44 may be copied to L14 the next time it is loaded into the work pixel buffer 410 for filtering of D21. Note that D22, D24, D42, D44, and B07 may be copied to respective locations the Left Work Buffer 1 when initially loaded in the work pixel buffer 410.

To support the filtering of the rightmost column of pixel blocks, the pixel blocks in the left neighboring column of this rightmost column, e.g., B21, B23, B41, B43, D21, D23, D41, D43, and B06 of FIG. 9, need to be stored in the Left Work Buffer 0 prior to filtering the SAO processing area of the subsequent LCU, e.g., LCU6 of FIG. 8, as well as the next-to-last pixel block in the Top Work Buffer, e.g., T06 of FIG. 9. The pixel blocks that will form the Left Work Buffer 0 for the next LCU, e.g., LCU6 of FIG. 8, are copied into the appropriate locations in this buffer in the work memory 412 "on-the-fly" when certain pixel blocks of the SAO processing area of the current LCU, e.g., LCU 5 of FIG. 8, are filtered.

The on-to-fly copying to the work buffer happens only when a pixel block in the work buffer is no longer needed for filtering. For example, when T06, B21, B23, and B41 are stored in the work pixel buffer 410 as part of one or more filter blocks, they can be copied to respective locations L00, L01, L02, and L03 in the Left Work Buffer 0 as the contents of these locations in the Left Work Buffer 0 are no longer needed for filtering of the SAO processing area. However, B43 cannot be copied to L04 the first time it is loaded into the work pixel buffer 410 as the current L04 is needed for filtering of subsequent pixel blocks. B43 may be copied to L04 the next time it is loaded into the work pixel buffer 410 for filtering of D12. Note that D21, D23, D41, D43, and B06 may be copied to respective locations the Left Work Buffer 0 when initially loaded in the work pixel buffer 410.

The bottom row of pixel blocks in the current LCU, e.g., LCU5 of FIG. 8, will be filtered as part of the SAO filtering area of the bottom neighboring LCU, e.g., LCU9 of FIG. 8.

Thus, the deblocked pixel blocks of the next-to-last row of the current LCU, e.g., LCU5 of FIG. 8, are potentially needed to filter the bottom row of pixel blocks and will be the contents of the Top Work Buffer in the work memory 412 when the SAO filtering area of the bottom neighboring LCU, e.g., LCU9 of FIG. 8, is processed. The deblocked pixel blocks of the next-to-last row of the current LCU, e.g., LCU5, are copied into the appropriate locations in top work buffer in the work memory 412 "on-the-fly" when these pixel blocks are loaded into the work pixel buffer 410. Note that by the time this next-to-last row is processed, the pixel blocks of the current Top Work Buffer are no longer needed. Thus, for example, referring to FIG. 9, when the pixel block C33 is loaded into the work pixel buffer 410, it is also stored in the T00 location of the Top Work Buffer. In another example, when the pixel block D43 is loaded into the work pixel buffer 410, it is also stored in the T06 location of the Top Work Buffer. Note that although D44 will not be filtered, it is loaded into the work pixel buffer 410 when D43 is loaded as it is potentially needed for filtering D43 and is also stored in the T07 location of the Top Work Buffer.

Referring again to FIG. 7, after all the pixel blocks in the current SAO processing area are filtered 712, the contents of the top pixel buffer in the work memory 412 and the SAO parameters of the current LCU, e.g., LCU5 of FIG. 8, are stored in the shared memory pool for future filtering of the bottom row of pixel blocks in the current LCU.

Figure 14:
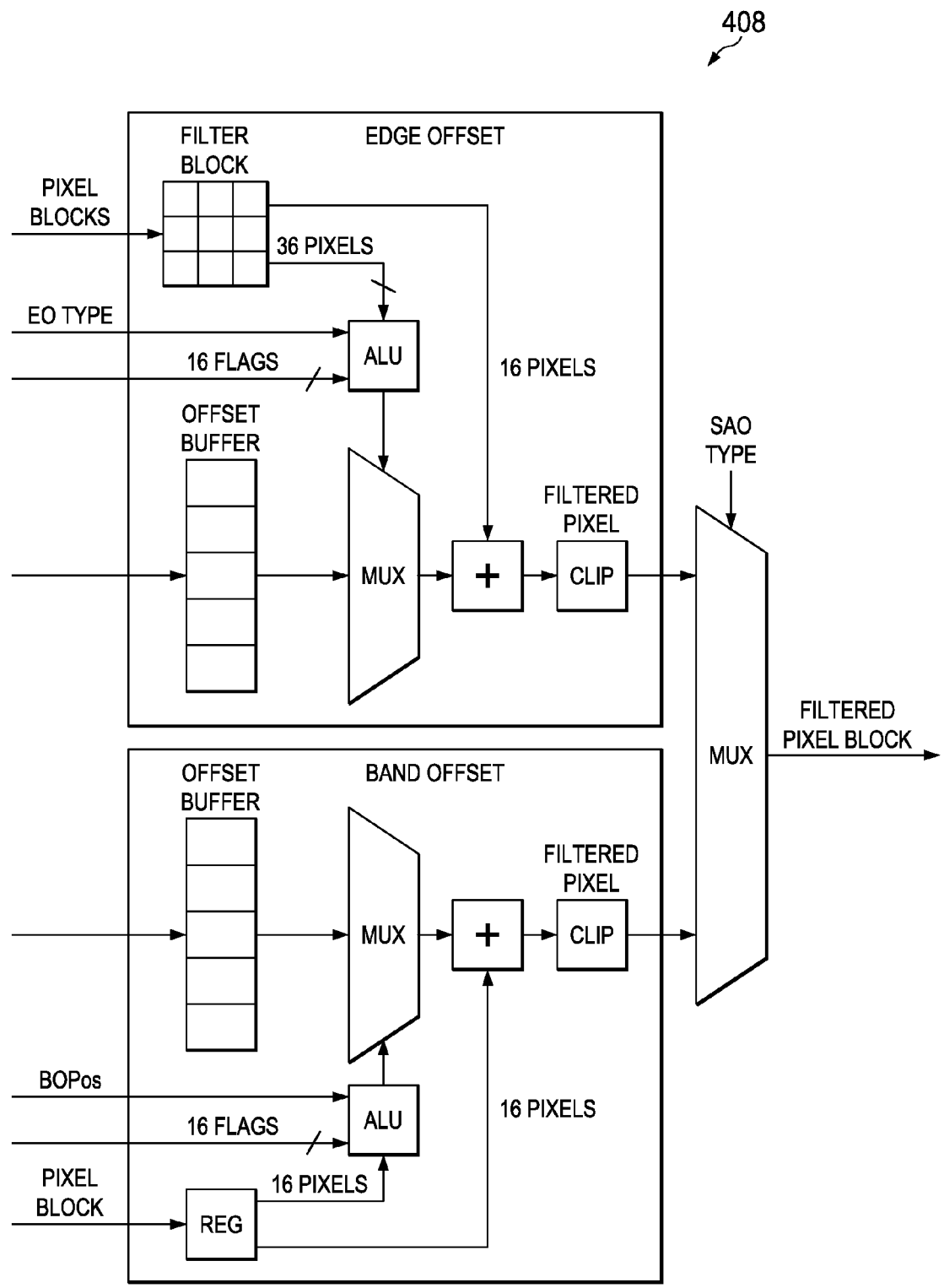
FIG. 14 is a block diagram of the filter engine of the SAO filter architecture.

FIG. 14 is a block diagram of the SAO filter engine 408 of FIG. 4. As previously mention, the filter engine 408 is configured to filter all sixteen pixels of a pixel block in parallel. The filter engine 408 includes an edge offset component for performing EO filtering of a pixel block and a band offset component for performing BO filtering of a pixel block. The controller 400 knows the SAO filter type of each pixel block and activates either the edge offset component or the band offset component for each pixel block based on its SAO filter type. The multiplexor at the outputs of the two filtering components also selects the output of the appropriate component based on the SAO filter type of the pixel block being filtered.

One of the inputs to each filtering component is a set of 16 flags, one for each pixel to be filtered. The controller 400 uses these flags to manage filtering behavior for boundary conditions. If the flag corresponding to a pixel is set to 1, no filtering is performed on the pixel, even if filtering is otherwise enabled for the current SAO processing area. The controller 400 may use these flags, for example, to disable EO filtering of pixels at the boundaries of a frame as the pixel data needed for EO filtering of such pixels may not be available. The controller 400 may also use these flags, for example, to disable EO and/or BO filtering of certain pixels if the frame parameters indicate that SAO filtering across slice and/or tile boundaries is disabled.

To perform EO filtering, the controller 406 causes the nine pixel blocks of the current filter block in the work pixel buffer 410 to be stored in the filter block storage of the edge offset component. Further, the controller provides the EO type (from the SAO parameters) for the current pixel block and the 16 flags to the ALU (arithmetic logic unit) and loads the four offsets (from the SAO parameters) into four locations of the offset buffer. The fifth location of the offset buffer is set to zero. As will be explained below, the offset buffer is indexed by the output of the ALU to select the offset to be added to a pixel. The fifth location that is set to zero is selected by an index value of zero.

The ALU receives thirty-six pixels from the filter block storage, the sixteen pixels of the current pixel block to be filtered and the twenty pixels needed from the neighboring blocks in the filter block. The ALU computes an offset index for each of the sixteen pixels in parallel as per $$\text{offsetIdx} = 2 + \text{sign}(p0-p1) + \text{sign}(p0-p2)$$
$$\text{if (offsetIdx} < 3) \text{ offsetIdx} = \text{offsetIdx} == 2 \text{ ? 0: offsetIdx} + 1$$

where p0 is a pixel to be filtered and p1 and p2 are neighboring pixels selected from the thirty-six input pixels according to the specified EO type. Further, the ALU forces the offset index to be zero for any pixel for which the corresponding flag in the sixteen flags is set to 1, indicating that the pixel is not to be filtered.

The sixteen offset indices computed by the ALU are input to a multiplexor that selects the offset values to be added to each pixel from the offset buffer based on values of the offset indices. The adder adds the sixteen offset values to the sixteen pixels of the current pixel block in parallel. The clip unit clips any pixel values that exceed the maximum pixel value, e.g., 255, and the resulting pixel block is stored in the work pixel buffer 410.

To perform BO filtering, the controller 406 causes the sixteen pixels of the current pixel block in the work pixel buffer 410 to be stored in the pixel block register storage of the band offset component. Further, the controller provides the band offset position (from the SAO parameters) for the current pixel block and the 16 flags to the ALU (arithmetic logic unit) and loads the four offsets (from the SAO parameters) into four locations of the offset buffer. The fifth location of the offset buffer is set to zero. As will be explained below, the offset buffer is indexed by the output of the ALU to select the offset to be added to a pixel. The fifth location that is set to zero is selected by an index value of zero.

The ALU receives the sixteen pixels from the pixel block register storage and computes an offset index for each of the sixteen pixels in parallel as per $$\text{bandNum} = p0 \text{ \& 0xF8} >> 3$$
$$\text{offsetIdx} = \text{bandNum} - \text{StartbandNum} + 1$$
$$\text{if (offsetIdx} < 1 \text{ or offsetIdx} > 5) \text{ offsetIdx} = 0$$

where p0 is a pixel to be filtered and StartbandNum is the band offset position (BOPos). Further, the ALU forces the offset index to be zero for any pixel for which the corresponding flag in the sixteen flags is set to 1, indicating that the pixel is not to be filtered.

The sixteen offset indices computed by the ALU are input to a multiplexor that selects the offset values to be added to each pixel from the offset buffer based on values of the offset indices. The adder adds the sixteen offset values to the sixteen pixels of the current pixel block in parallel. The clip unit clips any pixel values that exceed the maximum pixel value, e.g., 255, and the resulting pixel block is stored in the work pixel buffer 410.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming that the pixel blocks are 4×4. One of ordinary skill in the art will understand embodiments in which the size of the pixel blocks is different.

In another example, embodiments have been described herein assuming that the sub-processing areas of an SAO processing area are 16×16. One of ordinary skill in the art will understand embodiments in which the sub-processing areas are larger, e.g., 32×32.

In another example, embodiments have been described herein in which the filter engine includes separate components for EO and BO filtering. One of ordinary skill in the art will understand embodiments in which the design of the filtering engine is unified such the offset buffer, multiplexor, adder, and clip unit are used for both EO and BO filtering and two ALUs are provided, selected by SAO type, one for EO and one for BO.

In another example, embodiments have been described herein in which the LCUs in a frame are filtered in raster scan order. One of ordinary skill in the art will understand embodiments in which tiling is enabled and the LCUs are processed tile by tile. In such embodiments, left work buffers may be stored in the shared memory pool as well as the top work buffers and retrieved as needed.

In another example, one of ordinary skill in the art will understand embodiments in which the filter engine may be replicated to allow parallel SAO filtering of luma, Cb, and Cr pixel blocks.

In another example, one of ordinary skill in the art will understand embodiments in which the some or all of the work memory is outside of the SAO architecture, e.g., in an on-chip memory or an external memory.

In another example, one of ordinary skill in the art will understand embodiments in which the SAO architecture has a single unified buffer rather than a separate work pixel buffer and a separate work memory.

In another example, one of ordinary skill in the art will understand embodiments in which the scan order of the pixel blocks in an SAO processing area is different than that described above. For example, the pixel blocks may be scanned row-by-row in raster scan order or column-by-column in which each column is scanned top-to-bottom.

It is therefore contemplated that the appended claims will cover any such modifications of the embodiments as fall within the true scope of the invention.

What is claimed is:

1. A method for sample adaptive offset (SAO) filtering of largest coding units (LCUs) of a video frame in an SAO component, the method comprising:
   receiving, by the SAO component, an indication that deblocked pixel blocks of an LCU are available; and
   applying SAO filtering, by the SAO component, to each pixel block of pixel blocks of an SAO processing area corresponding to the LCU responsive to the indication,
   wherein pixels of each pixel block of the SAO processing area are filtered in parallel, and
   wherein the SAO processing area consists of all pixel blocks of the LCU except a rightmost column of pixel blocks in the LCU and a bottom row of pixel blocks in the LCU, a bottom row of pixel blocks of a top neighboring LCU of the LCU except for a rightmost pixel block of the bottom row, a rightmost column of pixel blocks of a left neighboring LCU of the LCU except for a bottom pixel block of the rightmost column, and a bottom rightmost pixel block of a top left neighboring LCU of the LCU.

2. The method of claim 1, wherein a pixel block is a 4×4 block of pixels.

3. The method of claim 1, wherein a pixel block is one selected from a group consisting of a luminance pixel block, a Cr pixel block, and a Cb pixel block.

4. The method of claim 1, wherein applying SAO filtering comprises:
   filtering each pixel block of the SAO processing area according to a scan order in which the SAO processing area is divided into non-overlapping sub-processing areas that are scanned in Z-scan order and pixel blocks within a sub-processing area block are scanned in raster scan order.

5. The method of claim 4, wherein a sub-processing area is a 16×16 block of pixels.

6. The method of claim 1, wherein applying SAO filtering comprises filtering the pixel blocks in the SAO processing area in a scan order selected from a group consisting of raster scan order and column by column scan order in which each column is scanned top to bottom.

7. The method of claim 1, wherein the pixel blocks of the LCU in the SAO processing area are stored in a memory comprised in the SAO component, the pixel blocks of the left neighboring LCU are stored in a first work buffer comprised in the SAO component, pixel blocks of a left neighboring column of the rightmost column of pixel blocks of the left neighboring LCU are stored in a second work buffer comprised in the SAO component, and pixel blocks of a top neighboring row of the bottom row of pixel blocks of the top neighboring LCU are stored in a third work buffer comprised in the SAO component.

8. The method of claim 7, wherein applying SAO filtering comprises:
   storing pixel blocks of a rightmost column of pixel blocks of the LCU in the first work buffer;
   storing pixel blocks of a left neighboring column of pixel blocks of the rightmost column in the second work buffer; and
   storing pixel blocks of a top neighboring row of pixel blocks of the bottom row of pixel blocks of the LCU in the third work buffer.

9. An apparatus for sample adaptive offset (SAO) filtering, the apparatus comprising:
   a memory;
   a controller coupled to the memory and configured to sequence loading of pixel blocks of an SAO processing area into the memory, filtering of the pixel blocks by a filter engine, and storing of the filtered pixel blocks, wherein the SAO processing area corresponds to a largest coding unit (LCU) of a video frame, and wherein the loading, filtering, and storing is performed responsive to an indication that deblocked pixel blocks of the LCU are available; and
   a filter engine coupled to the controller and the memory, wherein the filter engine is configured to apply SAO filtering to a pixel block of the SAO processing area stored in the memory, wherein all pixels in the pixel block are filtered in parallel, and wherein the SAO processing area consists of all pixel blocks of the LCU except a rightmost column of pixel blocks in the LCU and a bottom row of pixel blocks in the LCU, a bottom row of pixel blocks of a top neighboring LCU of the LCU except for a rightmost pixel block of the bottom row, a rightmost column of pixel blocks of a left neighboring LCU of the LCU except for a bottom pixel block of the rightmost column, and a bottom rightmost pixel block of a top left neighboring LCU of the LCU.

10. The apparatus of claim 9, wherein a pixel block is a 4×4 block of pixels.

11. The apparatus of claim 9, wherein a pixel block is one selected from a group consisting of a luminance pixel block, a Cr pixel block, and a Cb pixel block.

12. The apparatus of claim 9, wherein the controller is configured to load pixel blocks of the SAO processing area into the memory for filtering by the filter engine according to a scan order in which the SAO processing area is divided into non-overlapping sub-processing areas that are scanned in Z-scan order and pixel blocks within a sub-processing area block are scanned in raster scan order.

13. The apparatus of claim 12, wherein a sub-processing area is a 16×16 block of pixels.

14. The apparatus of claim 9, wherein the controller is configured to load pixel blocks of the SAO processing area into the memory for filtering by the filter engine in a scan order selected from a group consisting of raster scan order and column by column scan order in which each column is scanned top to bottom.

15. The apparatus of claim 9, wherein the memory comprises a first work buffer for storing the pixel blocks of the left neighboring LCU, a second work buffer for storing pixel blocks of a left neighboring column of the rightmost column of pixel blocks of the left neighboring LCU, and a third work buffer for storing pixel blocks of a top neighboring row of the bottom row of pixel blocks of the top neighboring LCU.

16. The apparatus of claim 15, wherein the controller is configured to cause first pixel blocks of a rightmost column of pixel blocks of the LCU to be stored in the first work buffer, second pixel blocks of a left neighboring column of pixel blocks of the rightmost column to be stored in the second work buffer, and third pixel blocks of a top neighboring row of pixel blocks of the bottom row of pixel blocks of the LCU to be stored in the third work buffer.

* * * * *